July 5, 1966     G. DE COYE DE CASTELET     3,258,827
GEAR-CUTTING WORM HOBS
Filed Oct. 4, 1965
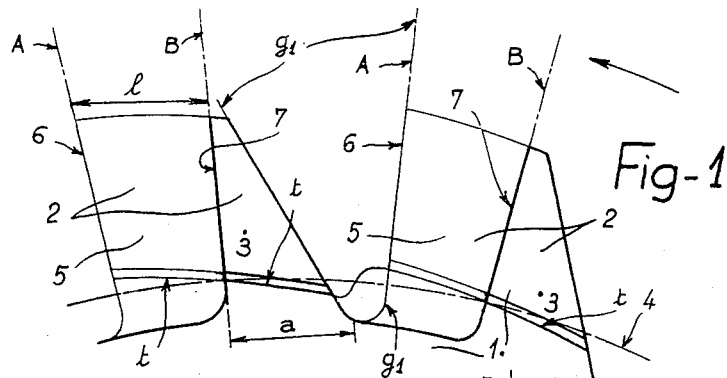
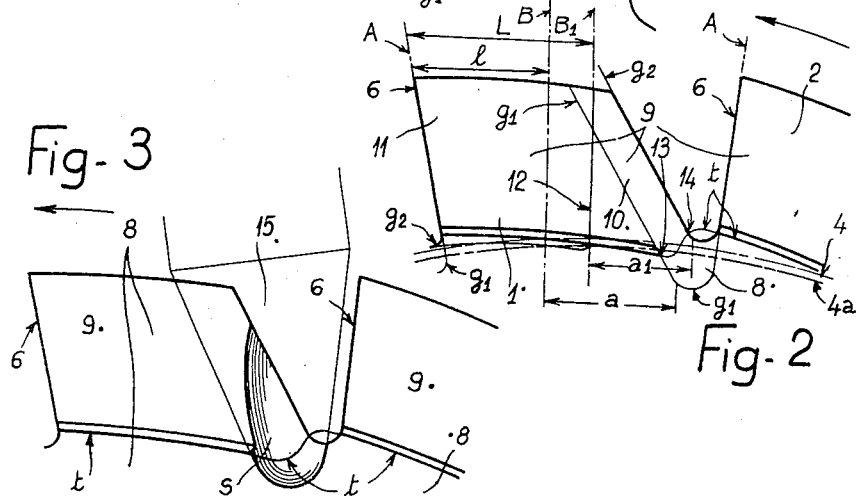
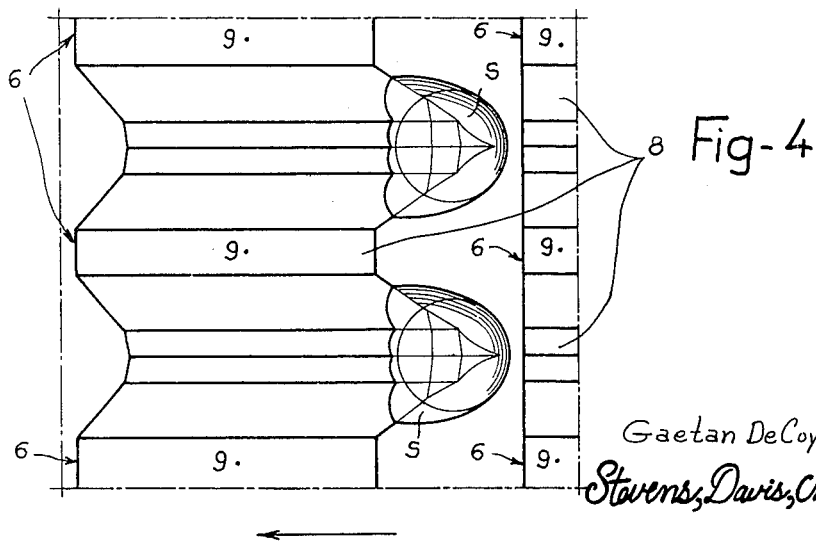
Inventor
Gaetan DeCoye DeCastelet
Stevens, Davis, Miller & Mosher
Attorneys

United States Patent Office 3,258,827
Patented July 5, 1966

3,258,827
GEAR-CUTTING WORM HOBS
Gaëtan de Coye de Castelet, Billancourt, France, assignor to Regie Nationale des Usines Renault, Billancourt, Seine, France
Filed Oct. 4, 1965, Ser. No. 492,486
Claims priority, application France, July 1, 1965, 23,177
2 Claims. (Cl. 29—103)

It is already known to utilize worm hobs for cutting involute gears by the so-called "meshing" or "generation" method. During the machining these tools often experience tooth breakages, resulting not only in the rejection of the worm hob, but frequently also in that of the pinion being cut and in damage to the machine tool itself. It will be appreciated that the risk of such fractures increases with the number of sharpenings carried out, which gradually thin down the teeth.

This invention relates to a worm hob for cutting gear wheels by an automatic generation process, and more particularly though not exclusively to a worm hob of constant profile which is essentially characterized in that the roots of the intervening spaces between the teeth of the same thread are located outside the cylinder passing through the roots of the profiles determined by the last utilization period, the useful length of each tooth being so increased that each tooth bears against the next tooth.

In view of the foregoing, if one now considers two hob worms for finishing the same pinion, one being of the conventional type and the other executed according to this invention, it will be seen that the teeth of the worm hob according to the invention are lower yet longer than those of the conventional hob. This results in the useful length of each tooth, or the length available for successive sharpenings, being increased, as is also the useful life of the hob; further, since a worm hob is an expensive item, the cost of a machining operation is substantially reduced. In addition, the teeth of a worm hob according to the invention are strong since they are both low and long, so that the machine tool can be operated with a high feed rate without danger of breaking one or more teeth.

In order to give a clearer understanding of the invention, it is now proposed to describe the teeth of a conventional worm hob and to compare them with the teeth according to the invention, with reference to the accompanying drawing, in which:

FIGURE 1 schematically represents a conventional worm hob;

FIGURE 2 shows diagrammatically one possible form of embodiment of the invention;

FIGURE 3 shows the element of FIGURE 2 fully completed; and

FIGURE 4 is a plan view on an enlarged scale of a portion of said element.

In FIGURE 1 of the accompanying drawing, reference numerals 2 and 3 respectively designate a new tooth of a conventional worm hob 1, having a gouge line $g_1$, and the same tooth when worm (or after ultimate utilization), subsequent to a maximum number of sharpenings, with a base having a minimum thickness $a$ indispensable $f$ to ensure adequate mechanical strength. The volume 5 of material removed by the sharpenings is included between two planes A and B passing respectively through the leading faces 6 and 7 of the teeth 2 and 3, the distance between these two planes, as measured at the tips of said faces, representing the available useful length $l$ for sharpening the hob 1.

Further, a line $t$ shows the paths followed by a tool (not shown), such as a grinding tool or a bladed tool, used for backing-off the flanks of the hob 1, especially during the hob finishing operation. Reference numeral 4 designates the cylinder passing through the roots of the ultimate-utilization profiles of worm hob 1.

Referring next to FIGURE 2, there is shown thereon the teeth 2 and the cylinder 4 of FIGURE 1, respectively new and worn (or ultimately utilized) teeth 9 and 10 of a worm hob 8 according to the invention, a cylinder $4a$ passing through the ultimate-utilization profiles of this hob, the line $g_1$, a line $g_2$ external to the cylinder $4a$ and showing the gouge line produced by hob 8, and the line $t$ indicating the paths followed by a backing-off tool. In this connection it is to be noted that the hobs 1 and 8, adapted to cut identical pinions, have identical leading faces, identical working angles, and naturally also the same outer diameters when new.

The volume of material 11 that can be removed from the hob 8 by successive sharpenings is included between the plane A and a plane $B_1$ passing through the leading face 12 of tooth 10, of which the thickness at the base is $a_1$, the useful sharpening length being equal to the distance L between the planes A and $B_1$, as measured at the tips of leading faces 6 and 12.

As is clearly shown, with the contours adopted for the gouge lines $g_1$ and $g_2$, the root of the intervening space between two successive teeth 2 or 9 is more distant on hob 8 than on hob 1 from the common axis (not shown) of these two hobs. As a result the teeth 9 are longer than the teeth 2. They are at the same time lower, so that a base thickness $a_1$ less than $a$ can be adopted for the tooth 10. For these two reasons the volume 11 is greater than the volume 5, and the useful length L of the worm hob 8 according to the invention is greater than the useful length $l$ of a conventional hob 1.

Whilst this achieves the objective of the present invention, on the other hand, in the form of embodiment hereinbefore described, the backing-off tool must unavoidably work between two points 13 and 14 along the path $t$, located on the gouge lines $g_1$ and $g_2$ respectively, using unduly large relief and negative-cut angles, and consequently under unsatisfactory conditions. In order to mitigate this disadvantage, a spherically tipped countersink 15, for instance (FIGURE 3), is used to provide a surface S (see FIGURES 3 and 4), thereby additionally avoiding any danger of a backing-off tool experiencing interference with the flanks of two successive teeth 9.

It goes without saying that many changes may be made to the exemplary form of embodiment described hereinabove, without departing from the spirit and scope of the invention as set forth in the appended claims.

What is claimed is:

1. A worm hob for cutting gears by an automatic generation process, characterized in that the roots of the intervening spaces between successive teeth of the same thread are located outside the cylinder passing through the roots of the ultimate-utilization profiles, the useful length of each tooth being so increased that each tooth bears against the next tooth.

2. A worm hob according to claim 1, characterized in that the rearward portion of the flanks of its teeth are partly relieved whereby to facilitate the work of a backing-off tool.

No references cited.

WILLIAM W. DYER, JR., *Primary Examiner.*
HARRISON L. HINSON, *Assistant Examiner.*